United States Patent [19]
Iwata et al.

[11] Patent Number: 5,019,836
[45] Date of Patent: May 28, 1991

[54] PRINTING METHOD OF THERMAL PRINTER

[75] Inventors: Satoshi Iwata; Kiyoshige Ishiyama, both of Ise, Japan

[73] Assignee: Shinko Electric Co., Ltd., Tokyo, Japan

[21] Appl. No.: 208,264

[22] Filed: Jun. 17, 1988

[30] Foreign Application Priority Data

Jun. 19, 1987 [JP] Japan ... 62-152807

[51] Int. Cl.[5] ... G01D 15/10; B41J 2/315

[52] U.S. Cl. ... 346/76 PH; 400/120

[58] Field of Search ... 346/76 PH, 1.1; 400/120 PH

[56] References Cited

U.S. PATENT DOCUMENTS 4,449,136 5/1984 Moriguchi et al. ... 346/76 PH
4,568,817 2/1986 Leng et al. ... 346/76 PH

FOREIGN PATENT DOCUMENTS 0154514 9/1985 European Pat. Off. .
0260917 3/1988 European Pat. Off. .
54-13345 1/1979 Japan ... 400/120
0027772 2/1982 Japan ... 400/120
0009772 1/1985 Japan ... 346/76 PH

*Primary Examiner*—Benjamin R. Fuller
*Assistant Examiner*—Huan Tran
*Attorney, Agent, or Firm*—Hoffmann & Baron

[57] ABSTRACT

When a print line is printed on a printing paper by supplying a print current to a thermal head, heating elements within the thermal head and a transfer ribbon are easily adhered together due to melted ink on surface of the transfer ribbon. Due to such adhering between the heating elements and the transfer ribbon, a white line is easily formed on a printing paper. In order to prevent such white line from being formed, the heating elements must be prevented from being cooled down after printing each print line. More specifically, in a period between a first time when each print line is completely printed and a second time when a printing paper is to be transported forward to a next print line, the heating elements are heated by relatively small heating value which is sufficient to melt a adhering portion formed between the heating elements and the transfer ribbon but which is insufficient to perform the printing. Thus, the heating elements are prevented from being adhered to the transfer ribbon, so that each print line can be printed with accuracy and without forming the white line.

8 Claims, 4 Drawing Sheets

PRINTING METHOD OF THERMAL PRINTER

BACKGROUND OF THE INVENTION

1. Field of the Invention

The present invention generally relates to a printing method of thermal printer, and more particularly to a printing method by which a printing quality of thermal printer can be improved.

2. Prior Art

FIG. 1 is a block diagram showing an electric constitution of conventional thermal printer In FIG. 1, designates a line buffer for storing print data DB which has been subjected to a dot conversion, and 2 designates a control section having a micro processing unit (MPU), a working memory and a program memory. This control section 2 has a function for reading out the print data DB stored in the line buffer 1 and another function for inputting control signals and data into several kinds of circuits which will be described later. In addition, 3 designates an interface circuit which executes the communication of data between the control section and an external device (not shown, e.g. a micro computer). Further, 4 designates a head consisting of a shift register circuit 5, a latch circuit 6, a driver circuit 7 and a heating body 8. The shift register circuit 5 is constituted by a serial-in-parallel-out shift register, and the shift register circuit 5 reads the print data DB outputted from the control section 2 based on a clock signal CLK and then outputs the read print data DB to the latch circuit 6. The latch circuit 6 reads the output of shift register circuit 5 based on a latch signal DR outputted from the control section 2 and then outputs the read output of shift register circuit 5 to the driver circuit 7. This driver circuit 7 consists of four blocks, i.e., four drivers a to *7d*. The driver *7a* consists of NAND gates Ga1 to Gan, the driver *7b* consists of NAND gates Gb1 to Gbn, the driver *7c* consists of NAND gates Gc1 to Gcn, and the driver *7d* consists of NAND gates Gd1 to Gdn. Each of first input terminals of these NAND gates is connected to each output terminal of the latch circuit 6, while second input terminals of the NAND gates within each block (or each driver) are connected together in common. The heating body 8 consists of heating elements THa1 to THan, THb1 to THbn, THc1 to THcn and THd1 to THdn. Each of first terminals of these heating elements is connected to the output terminal of corresponding NAND gate within the drivers *7a* to *7d*, while second terminals of these heating elements are all connected in common to a positive power source +V.

Next, 9 designates a timer circuit. When the control section 2 supplies common pulses CM1 to CM4 to the timer circuit 9, the timer circuit 9 sequentially generates current-on pulse signals C1 to C4 each having a pulse width W1 corresponding to current-on data TD supplied from the control section 2. These current-on pulse signals C1 to C4 are sequentially generated by predetermined intervals. Each of these pulse signals C1 to C4 is outputted to the common connection point between the second input terminals of the NAND gates within each driver. In FIG. 1, 10 designates a motor drive circuit which drives a pulse motor (or a step motor) 11 by one pulse based on a control signal MC supplied from the control section 2. This pulse motor 11 revolves a platen roller 12.

In such thermal printer which is constituted as described heretofore, the control section 2 inputs the print data DB outputted from the external device via the interface circuit 3, and then the control section 2 stores the inputted print data DB in the line buffer 1. Next, the control section 2 supplies first print data DB(1) for printing a first print line to the shift register circuit 5 in synchronism with the clock signal CLK. In addition, the control section 2 supplies the current-on data TD to the timer circuit 9. When the first print data DB(1) has been stored in the shift register circuit 5, the control section 2 supplies the latch signal DR to the latch circuit 6 to thereby keep the first print data DB(1) in the shift register circuit 5. At the same time, the control section 2 supplies second print data DB(2) to the shift register circuit 5. Next, the control section 2 sequentially outputs the common pulses CM1 to CM4 to the timer circuit 9 by the predetermined intervals, so that the timer circuit 9 sequentially generates current-on pulses C11 to C41 show in FIG. 2. Each of these current-on pulses C11 to C41 is supplied to each common connection point of the NAND gates within each driver. Due to these current-on pulses C11 to C41, the output terminal of NAND gate whose first input terminal is at "1" level becomes "0" level. As a result, current flows through the heating element connected with the NAND gate whose output terminal is at "0" level. In this case, the area corresponding to the NAND gate whose output terminal is at "0" level is printed, but the area corresponding to the NAND gate whose output terminal is at "1" level is not printed. Thus, the printing of a first print line will be executed. After the printing of first print line is completed, the control section 2 drives the pulse motor 11 so as to transport a printing paper forward by one step. In this case, a period T1 shown in FIG. 2 designates a period between a first time when the control section 2 supplies the control signal MC to the motor drive circuit 10 and a second time when the pulse motor 11 actually starts to revolve and then completes revolution of one step.

Thereafter, the similar printing operation as described heretofore is repeatedly performed on the print data DB(2) to DB(N), so that printing of one page will be completed.

Next, description will be given with respect to the detailed printing process of thermal transfer type thermal printer, illustrated in FIG. 3.

In FIG. 3, a transfer ribbon 13 and a printing paper 14 piled together are inserted between the thermal head 4 and the platen roller 12. In this case, the heating element THa1 arranged at a center portion of the edge end of thermal head 4 presses the transfer ribbon 13. This heating element THa1 is heated in a printing mode so that ink painted on the transfer ribbon 13 will be melted and then the melted ink will be adhered to the printing paper 14. Thus, the thermal transfer is performed.

Meanwhile, in the case where the conventional thermal printer performs the printing when the surrounding temperature is relatively low, white lines (or spaces)are formed on the, printed paper in a print line direction as a result of a phenomenon, referred to as in which there appears or occurs white lines amongst the whole printed result.

FIG. 4 shows an example of printing which results when the sticking phenomenon occurs. In FIG. 4, a print line N+1 is shifted from a predetermined printing position and certain part thereof is printed over a print line N, so that interval portion between the print lines, N+1 and N+2 must become large. Therefore the resulting interval portion between print lines N+1 and N+2 is seen as a white line.

Next, description will be given with respect to the cause for occurring the sticking phenomenon. As described above, this sticking phenomenon occurs when the surrounding temperature about the thermal head 4 is low. The cause of sticking phenomenon will be as follows. When the surrounding temperature about the thermal head 4 is low, the control section 2 must widen the pulse widths of current-on pulse signals C1 to C4 in order to raise the heating temperature of each heating element of the thermal head 4, to predetermined printing temperature. On the other hand, in the case where the pulse widths of these pulse signals C1 to C4 are so widened, the heating elements which are supplied with the current-on pulses in initial orders must be cooled down. For this reason, after the ink on the surface of transfer ribbon is melted due to the heat of the heating element, the melted ink is cooled and then adhered to the heating element. Thus, when the printing paper 14 is driven by one step after the printing of one print line is completed, the printing paper can not be transported forward by a predetermined distance. As a result, the interval distances between the print lines will become irregular.

As described above, in the case where the surrounding temperature is low, the transfer ribbon is adhered to the heating elements of thermal head so that the printing paper can not be transported forward in normal manner. Hence, the conventional thermal printer suffers a problem in that the white lines are formed in the print direction of thermal head so that the whole printed result is seen as having white lines formed across the printed matter in the direction of the thermal head 4.

SUMMARY OF THE INVENTION

Accordingly, it is a primary object of the present invention to provide a printing method of thermal printer by which the white lines are not formed on the printing paper in the print direction of thermal head even when the surrounding temperature is low.

In a first aspect of the invention, there is provided a printing method of thermal printer in which a print current flows into a thermal head to heat the thermal head and thereby print each print line whereas, the improvement comprises generating a current corresponding to a heating value which is sufficient to melt a adhering portion formed between heating elements of the thermal head and a transfer ribbon but which is insufficient to perform the printing, and supplying the current to the thermal head in a period between a first time when each print line is completely printed and a second time when a printing paper is to be transported forward to a next print line.

In a second aspect of the invention, there is provided a printing method for a thermal printer in which a print current flows into a thermal head to thereby print each print line so that a printing will be performed, the improvement comprising generating a current corresponding to a heating value which is sufficient to melt a adhering portion formed between heating elements of the thermal head and a thermosensible paper but which is insufficient to perform the printing, and supplying the current to the thermal head during the time period defined between a first instance time when each print line is completely printed and a second instance of time when the thermosensible paper is to be transported forward to a next print line.

In a third aspect of the invention, there is provided a thermal printer which performs printing using a thermal head which includes a plurality of heating elements and by transporting a printing paper forward by each print line by driving a pulse motor which revolves a platen roller, the thermal printer comprising:

(a) control means for generating a common pulse and current-on data; and (b) means for generating a current-on pulse signal in response to the common pulse and the current-on data, the current-on pulse signal consisting of a first pulse having a first pulse width corresponding to a first heating value for performing the printing and a second pulse having a second pulse width corresponding to a second heating value which is sufficient to melt a adhering portion formed between the heating elements and a transfer ribbon or a thermosensible paper but which is insufficient to perform the printing, the first pulse being supplied to a driver of the thermal head so that each print line will be printed when the printing is performed, and the second pulse being supplied to the driver of the thermal head so that the printing will be prevented from being performed in a period between a first time when each print line is completely printed and a second time when a printing paper or said thermosensible paper is to be transported forward to a next print line.

BRIEF DESCRIPTION OF THE DRAWINGS

Further objects and advantages of the present invention will be apparent from the following description, reference being had to the accompanying drawings wherein a preferred embodiment of the present invention is clearly shown.

In the drawings.

DESCRIPTION OF AN PREFERRED EMBODIMENT

Next, description will be given with respect to an embodiment of thermal printer adopting the printing method according to the present invention in conjunction with FIGS. 5 and 6.

Figure 1:
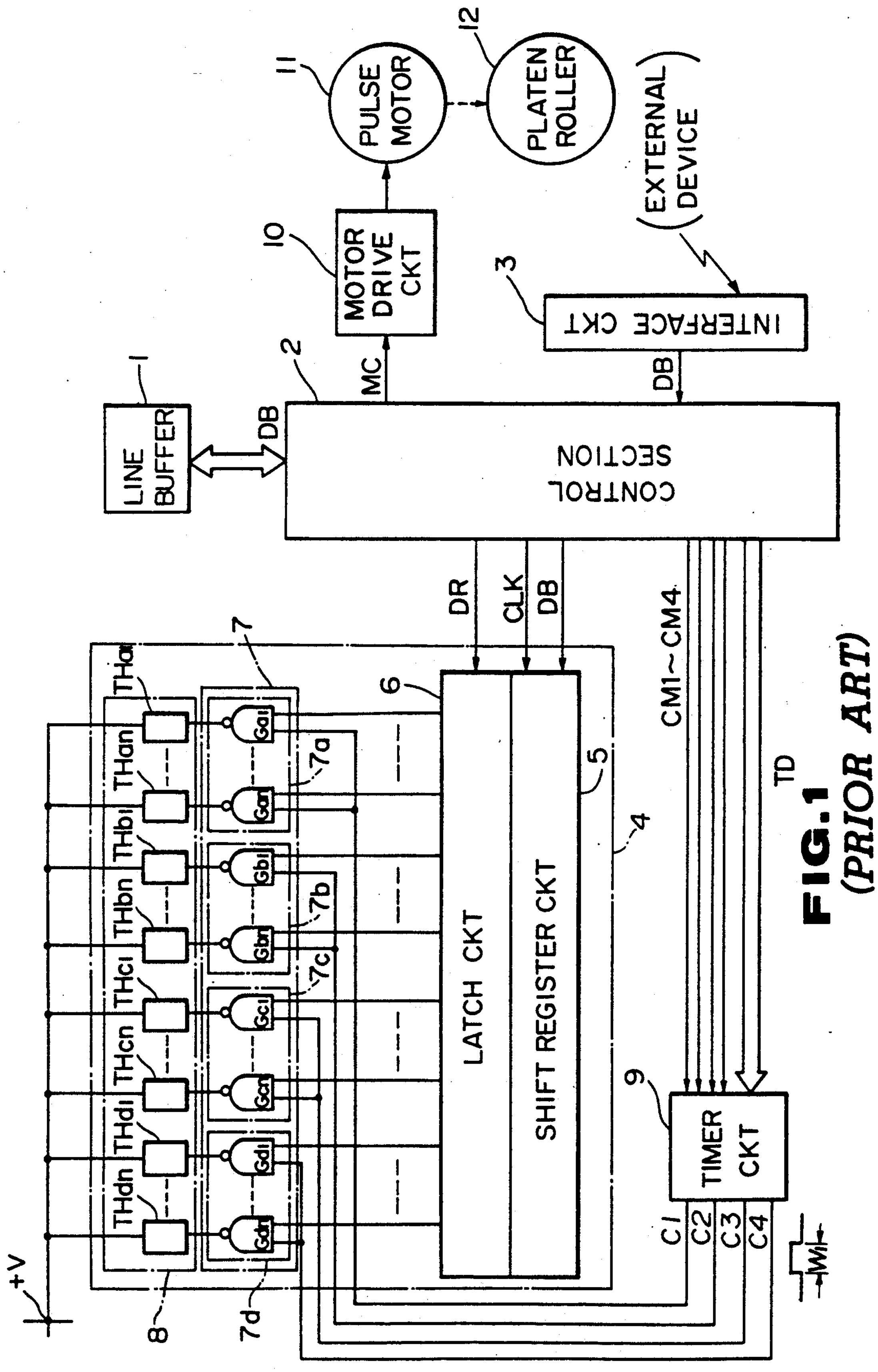
FIG.1 (PRIOR ART)
FIG. 1 is a block diagram showing an electric constitution of conventional thermal printer.
Figure 2:
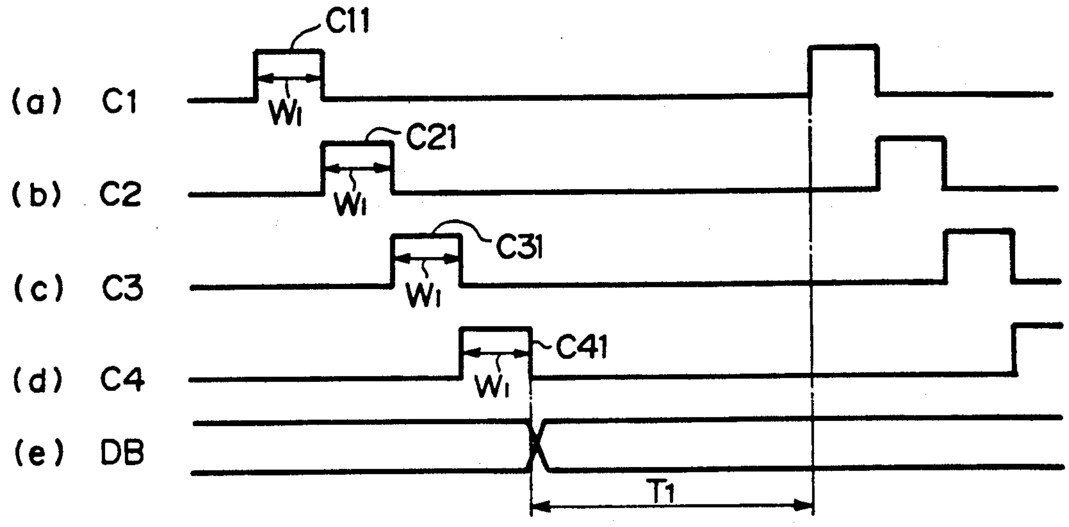
FIG. 2 shows waveforms for explaining the printing operation of the conventional thermal printer.
Figure 3:
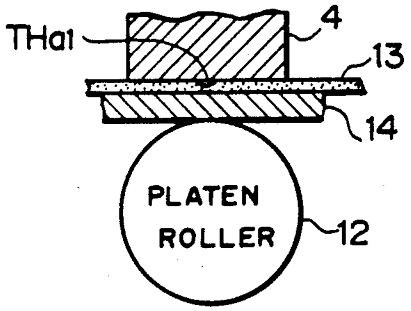
FIG. 3 is a side view showing a main part of conventional thermal printer for explaining the problem of conventional thermal printer.
Figure 4:
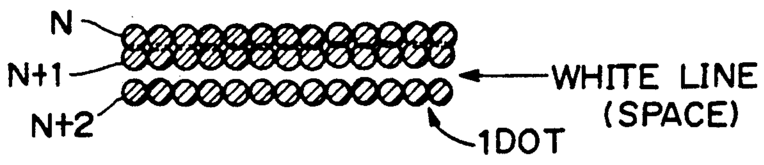
FIG. 4 shows an example of printed result for explaining the sticking phenomenon.
Figure 5:
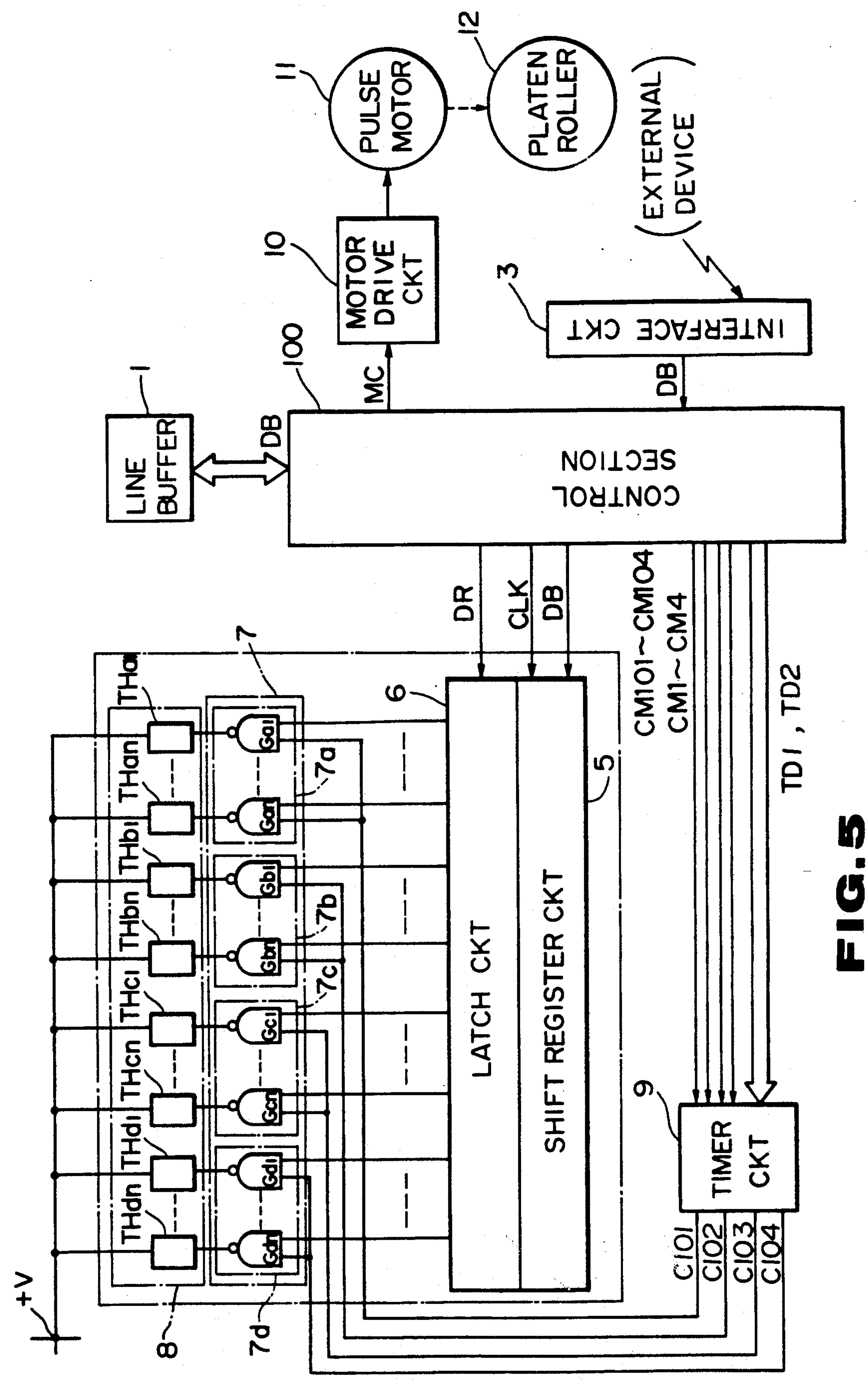
FIG. 5 is a block diagram showing an electric constitution of thermal printer adopting the printing method according to the present invention.
Figure 6:
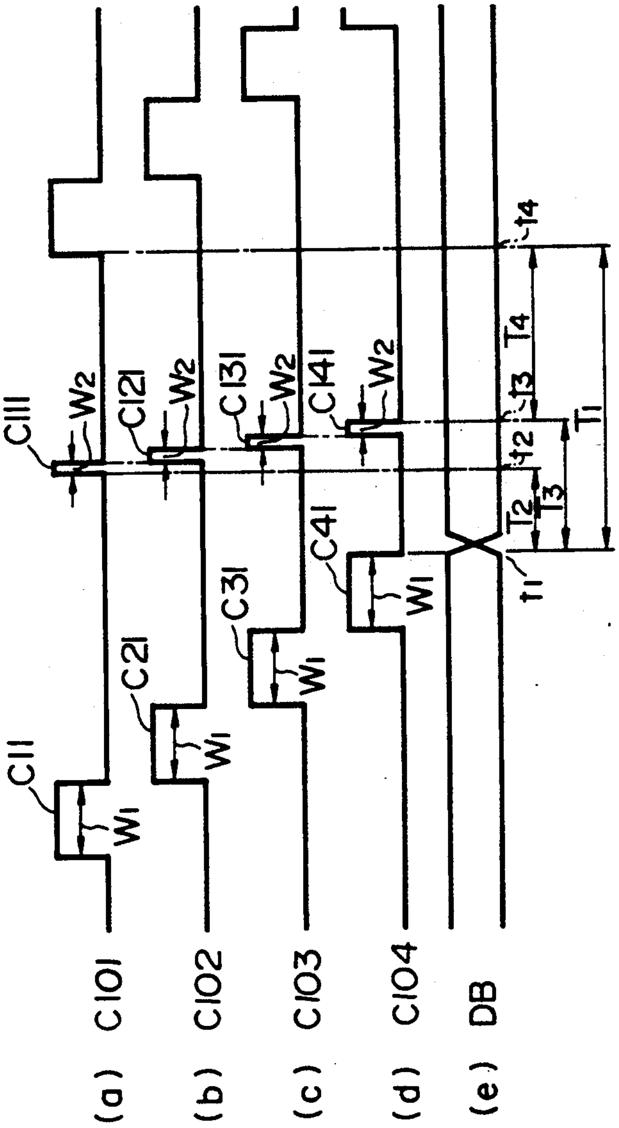
FIG. 6 shows waveforms for explaining the present printing operation.

FIG. 5 is a block diagram showing an embodiment of thermal transfer type thermal printer adopting the present invention. In this embodiment of FIG. 5, parts corresponding to those shown in FIG. 1 are designated by the same numerals, and description thereof will be omitted.

In FIG. 5, 100 designates a control section having the MPU, the working memory and the program memory. In the present embodiment, the timer circuit 9 outputs current-on pulse signals C101 to C104 as shown in FIGS. 6(a) to 6(*d*) under control of this control section 100. These current-on pulse signals C101, C102, C103, C104 respectively include current-on pulses C11 and C111, C21 and C121, C31 and C131, C41 and C141, which will be described later. This control section 100 has the following function in addition to the functions of the control section 2 described in FIG. 1. More specifically, this control section 100 has the function for controlling the timer circuit 9 to generate current-on pulses C111 to C141 each having a pulse width W2 in a period between a time when the printing of one print line is completed and a next time when the printed paper is driven to be transported forward by one step. This pulse width W2 corresponds to the heating value which is sufficient to melt the ink on the surface of transfer ribbon but which is insufficient to perform the printing.

Next, detailed description will be given with respect to timings for generating the current-on pulses C111 to C141 each having the above pulse width W2 in conjunction with FIG. 6.

When the printing of one print line is completed, the control section 100 drives the pulse motor 11 to thereby revolve the platen roller 12 in order to transport the printing paper forward by one pitch distance. In this case, there must be a mechanical response delay between a time when the pulse motor 11 is started to be driven and a next time when the platen roller 12 is actually revolved. By considering such response delay period T3, the current-on pulse having the pulse width W2 is generated. More specifically, such current-on pulse must be generated at a time t2 just before a time t3 when the response delay period T3 has been passed and then the platen roller 12 is revolved as shown in FIG. 6(*a*). On the contrary, when the current-on pulse having the pulse width W2 is generated in an initial period of response delay period T3, the heating elements must be cooled so that the melted ink on the surface of transfer ribbon will become hard again and then adhered to the heating elements. This is why the current-on pulse must be generated at the time t2.

Next, description will be given with respect to the printing operation of the present embodiment having the above-mentioned control section 100.

At first, the control section 100 supplies the first print data DB(1) to the shift register circuit 5 in synchronism with the clock signal CLK. Next, the control section 100 supplies the current-on data TD1 to the timer circuit 9. Further, the control section 100 supplies the latch signal DR to the latch circuit 6 to thereby hold the first print data DB(1), and the control section 100 sequentially supplies the common pulses CM1 to CM4 to the timer circuit 9 by predetermined intervals. Then, the timer circuit 9 sequentially generates the current-on pulses C11 to C41 each having the pulse width W1 designated by the current-on data TD1 in accordance with the timings designated by the common pulses CM1 to CM4 as shown in FIG. 6, and these pulses are respectively supplied to the common connection points of the NAND gates within the driver circuit 7. Thus, the current flows through the heating element connected to the NAND gate whose output terminal is at "0" level, and then this heating element will be heated. As a result, the printing of first print line is completed. At this time, the control section 100 sequentially supplies the common pulses CM101 to CM104 to the timer circuit 9 by predetermined intervals at the time t2 just before the time t3 when the platen roller 12 is driven, so that the timer circuit 9 will sequentially generate the current-on pulses C111 to C141 each having the pulse width W2 designated by current-on data TD2 in accordance with the timings designated by the common pulses CM101 and CM104. Thus the current flows through the heating element connected to the NAND gate whose output terminal is at "0" level, and then this heating element will be heated. Next, the platen roller 12 is driven by one pitch distance in a period T4 between times t3 and t4 after the timer circuit 9 generates the current-on pulse C141. Thereafter, similar printing operation will be repeatedly performed with respect to the print data DB(2) to DB(N), so that the printing of one page will be completed.

As described heretofore, at every time when the printing of each print line is completed, the current-on pulse having the pulse width sufficient to remelt adhered ink but insufficient for the printing to be performed, is supplied to the heating elements just before the printing paper is driven by one step. Hence, the present invention can prevent the adhering state between the heating elements and the surface of transfer ribbon from occurring.

Above is the description of present embodiment. This invention may be practiced or embodied in still other ways without departing from the spirit or essential character thereof. In the present embodiment, the pulse width of each of current-on pulses C111 to C141 is set constant. However, cooling rate of each heating element must be increased in an order for sequentially supplying the current-on pulses C11 to C41. In order to compensate such cooling rate with accuracy, it is possible to set that the pulse width will become smaller in an order of current-on pulses C111, C121, C131 and C141. Instead of varying the pulse widths of current-on pulses C111 to C141, it is possible to vary amplitudes thereof. In addition, the present invention is applied to the thermal transfer type printer in the present embodiment. However, it is possible to similarly apply the present invention to a thermal printer using a thermosensible paper which consists of coloring layer and basic paper. In this coloring layer, a printing image is formed by applying the heat thereto by use of the thermal head. This coloring layer is formed on the basic paper. After all, the preferred embodiment described herein is illustrative and not restrictive, the scope of the invention being indicated by the appended claims and all variations which come within the meaning of the claims are intended to be embraced therein.

What is claimed is:

1. In a printing method carried out by a thermal printer in which a printing paper is repeatedly transported forward from a print line to a next print line, relative to a transfer ribbon having meltable ink on the surface thereof, and a thermal head having a plurality of heating elements which are capable of melting said ink on said transfer ribbon when a print current flows into said thermal head to heat said thermal head and thereby print each print line, wherein the improvement comprises:

generating a pulsed current corresponding to a heating value which is sufficient to melt an adhering portion of said transfer ribbon which is adhered to one or more of said heating elements of said thermal head but which is insufficient to melt said ink in order to perform printing of said print lines, said pulsed current including a pulse signal having pulses each with a pulse width which corresponds to said heating value which is sufficient to melt said adhering portion formed between said heating elements of said thermal head and said transfer ribbon but which is insufficient to perform said printing of said print lines; and supplying said generated pulsed current to said heating elements of said thermal head such that the pulses occur only during a non-printing of time defined between a first instance of time when each said print line is completely printed and a second instance of time when said printing paper is to be transported forward a predetermined distance to said next print line.

2. The printing method according to claim 1, wherein said heating elements within said thermal head are divided into groups, each of which is sequentially supplied with said current so that said groups of heating elements will be sequentially heated by said amount of said heating value.

3. In a printing method carried out by a thermal printer in which a thermosensible paper having a meltable ink thereon is repeatedly transported forward from a print line to a next print line, and a thermal head having a plurality of heating elements which are capable of melting said ink on said thermosensible paper when a print current flows into said thermal head to heat said thermal head and thereby print each print line, wherein the improvement comprises:

generating a pulsed current corresponding to a heating value which is sufficient to melt an adhering portion of said thermosensible paper which is adhered to one or more of said heating elements of said thermal head but which is insufficient to melt said ink in order to perform printing of said print lines, said pulsed current including a pulse signal having pulses each with a pulse width which corresponds to said heating value which is sufficient to melt said adhering portion formed between said heating elements of said thermal head and said thermosensible paper but which is insufficient to perform the printing of said print lines; and supplying said generated pulsed current to said heating elements of said thermal head such that the pulses occur only during a non-printing period of time defined between a first instance of time when each said print line is completely printed and a second instance of time when said thermosensible paper is to be transported forward a predetermined distance to said next print line.

4. The printing method according to claim 3, wherein said heating elements within said thermal head are divided into groups, each of which is sequentially supplied with said current so that said groups of heating elements will be sequentially heated by said current of said heating value.

5. A thermal printer for performing printing on a printing paper, in which said printing paper is repeatedly transported forward from a print line to a next print line, relative to a transfer ribbon having a meltable ink on the surface thereof, and a thermal head having a plurality of heating elements capable of melting said ink on said transfer ribbon, and said printing paper being repeatedly transported forward from a print line to a next print line by driving a pulse motor which revolves a platen roller in contact with said printing paper, said thermal printer comprising:

(a) control means for generating a common pulse and current-on data; and (b) means for generating a current-on pulse signal in response to said common pulse and said current-on data, said current-on pulse signal consisting of a first pulse having a first pulse width corresponding to a first heating value for performing the printing, and a second pulse having a second pulse width corresponding to a second heating value which is sufficient to melt an adhering portion formed between said heating elements and a transfer ribbon or a thermosensible paper but which is insufficient to perform the printing, said first pulse being supplied to a driver of said thermal head so that each print line will be printed when said printing is performed, and said second pulse being supplied to said driver of said thermal head only during a non-printing period of time defined between a first instance of time when each print line is completely printed and a second instance of time when printing paper is to be transported forward a predetermined distance to said next print line.

6. The thermal printer according to claim 5, wherein said heating elements are divided into n groups, where n is an arbitrary integral number larger than one, and said control means generates n common pulses and said means generates n current-on pulses each having said first or second pulse width, said groups of heating elements being sequentially heated by said second heating value during said period of time defined between said first instance of time and said second instance of time.

7. A thermal printer for performing printing on a thermosensible paper having a meltable ink thereon, in which said thermosensible paper is repeatedly transported forward from a print line to a next print line, and a thermal head having a plurality of heating elements capable of melting said ink on said thermosensible paper, and said thermosensible paper being repeatedly transported forward from a print line to a next print line by driving a pulse motor which revolves a platen roller in contact with said thermosensible paper, said thermal printer comprising:

(a) control means for generating a common pulse and current-on data; and (b) means for generating a current-on pulse signal in response to said common pulse and said current-on data, said current-on pulse signal consisting of a first pulse having a first pulse width corresponding to a first heating value for performing the printing, and a second pulse having a second pulse width corresponding to a second heating value which is sufficient to melt an adhering portion formed between said heating elements and said thermosensible paper but which is insufficient to perform said printing, said first pulse being supplied to a driver of said thermal head so that each print line will be printed when said printing is performed, and said second pulse being supplied to said driver of said thermal head only during a non-printing period of time defined between a first instance of time when each print line is completely printed and a second instance of time when thermosensible paper is to be transported forward a predetermined distance to said next print line.

8. The thermal printer according to claim 7, wherein said heating elements are divided into n groups, where n is an arbitrary integral number larger than one, and said control means generates n common pulses and said means generates n current-on pulses each having said first or second pulse width, said groups of heating elements being sequentially heated by said second heating value during said period of time defined between said first instance of time and said second instance of time.

* * * * *

UNITED STATES PATENT AND TRADEMARK OFFICE
CERTIFICATE OF CORRECTION

PATENT NO. : 5,019,836

DATED : May 28, 1991

INVENTOR(S) : Iwata et al.

It is certified that error appears in the above-identified patent and that said Letters Patent is hereby corrected as shown below:

Column 1, Line 12, after "thermal", change "printer In" to --printer. In--;

Column 1, Line 12, after "In", change "Fig.1, designates" to --Fig.1, 1 designates--;

Column 1, Line 35, after "four", change "drivers a to 7d" to --drivers 7a to 7d--;

Column 2, Line 59, after "formed", change "on the, printed" to --on the printed--;

Column 2, Line 60, after "referred", change "to as in which" to --to a sticking phenomenon in which--;

Column 3, Line 7, after "phenomenon", change "will be as follows" to --will be explained as follows--;

UNITED STATES PATENT AND TRADEMARK OFFICE

CERTIFICATE OF CORRECTION

PATENT NO. : 5,019,836

DATED : May 28, 1991

INVENTOR(S) : Iwata et al

It is certified that error appears in the above-identified patent and that said Letters Patent is hereby corrected as shown below:

Column 7, line 6, after "a", change "non-printing of time" to --non-printing period of time--.

Signed and Sealed this

Seventeenth Day of November, 1992

*Attest:*

DOUGLAS B. COMER

*Attesting Officer* *Acting Commissioner of Patents and Trademarks*